United States Patent
Dias et al.

(10) Patent No.: US 10,040,350 B2
(45) Date of Patent: Aug. 7, 2018

(54) CONTROL APPARATUS AND RELATED METHOD

(71) Applicant: Jaguar Land Rover Limited, Coventry (GB)

(72) Inventors: Eduardo Dias, Coventry (GB); Robert Hardy, Coventry (GB); Sebastian Paszkowicz, Coventry (GB); Anna Gaszczak, Coventry (GB); Thomas Popham, Coventry (GB); George Alexander, Coventry (GB)

(73) Assignee: Jaguar Land Rover Limited, Whitley, Coventry (GB)

(*) Notice: Subject to any disclaimer, the term of this patent is extended or adjusted under 35 U.S.C. 154(b) by 5 days.

(21) Appl. No.: 15/306,595

(22) PCT Filed: Apr. 30, 2015

(86) PCT No.: PCT/EP2015/059533
§ 371 (c)(1),
(2) Date: Oct. 25, 2016

(87) PCT Pub. No.: WO2015/166059
PCT Pub. Date: Nov. 5, 2015

(65) Prior Publication Data
US 2017/0120749 A1    May 4, 2017

(30) Foreign Application Priority Data
May 1, 2014   (GB) .................................. 1407715.0

(51) Int. Cl.
*B60K 28/06*  (2006.01)

(52) U.S. Cl.
CPC .................. *B60K 28/066* (2013.01)

(58) Field of Classification Search
CPC .. B60K 28/066; B60K 28/06; G06K 9/00845; B60W 50/14
See application file for complete search history.

(56) References Cited

U.S. PATENT DOCUMENTS

2003/0096594 A1   5/2003   Naboulsi
2005/0100191 A1   5/2005   Harbach et al.
(Continued)

FOREIGN PATENT DOCUMENTS

DE   10 2011 084 887 A1   4/2013
DE       102011084887    *  4/2013  ............ B60K 35/00
(Continued)

OTHER PUBLICATIONS

Combined Search and Examination Report, GB Application No. 1407715.0, dated Nov. 11, 2014, 7 pages.
(Continued)

*Primary Examiner* — Hongmin Fan
(74) *Attorney, Agent, or Firm* — Myers Bigel, P.A.

(57) ABSTRACT

The present disclosure relates to a method of controlling one or more vehicle systems. The method uses at least one sensor (3-1, 3-2) to monitor a driver (D) to identify a driver distracted state. One or more functions of a first vehicle system (7, 9, 17) are inhibited when the driver distracted state is identified. The present application also relates to a control apparatus (1); and to a vehicle (V). The present disclosure also relates to a method and related apparatus for controlling the output of a visual notification within the vehicle (V).

20 Claims, 7 Drawing Sheets (56) References Cited

U.S. PATENT DOCUMENTS

| | | | | |
|---|---|---|---|---|
| 2010/0014711 A1* | 1/2010 | Camhi | .................. | B60K 28/06 |
| | | | | 382/104 |
| 2012/0200490 A1 | 8/2012 | Inada | | |
| 2012/0215403 A1* | 8/2012 | Tengler | ................ | B60W 50/12 |
| | | | | 701/36 |
| 2013/0044000 A1* | 2/2013 | Nakai | ..................... | A61B 5/18 |
| | | | | 340/575 |
| 2016/0055764 A1* | 2/2016 | Kujala | ................. | B60W 50/14 |
| | | | | 434/66 |

FOREIGN PATENT DOCUMENTS

| | | |
|---|---|---|
| EP | 2 765 568 A1 | 8/2014 |
| JP | 2007-286959 A | 11/2007 |
| JP | 2010-126135 A | 6/2010 |
| JP | 2012-164012 A | 8/2012 |
| WO | WO 2012/166708 A1 | 12/2012 |
| WO | WO 2013/051307 A1 | 4/2013 |

OTHER PUBLICATIONS

Combined Search and Examination Report, GB Application No. 1507384.4, dated Oct. 26, 2015, 13 pages.
Notification of Transmittal of the International Search Report and the Written Opinion of the International Searching Authority, or the Declaration, PCT/EP2015/059533, dated Sep. 30, 2015, 9 pages.
Office Action and English language summary, JP Application No. 2016-565436, dated Dec. 12, 2017, 5 pp.

* cited by examiner

CONTROL APPARATUS AND RELATED METHOD

RELATED APPLICATIONS

This application is a 35 U.S.C. § 371 national stage application of PCT Application No. PCT/EP2015/059533, filed on Apr. 30, 2015, which claims priority from Great Britain Patent Application No. 1407715.0 filed on May 1, 2014, the contents of which are incorporated herein by reference in their entireties. The above-referenced PCT International Application was published in the English language as International Publication No. WO 2015/166059 A1 on Nov. 5, 2015.

TECHNICAL FIELD

The present disclosure relates to a control apparatus and related method and particularly, but not exclusively, to a method of controlling one or more vehicle systems; to a control apparatus for controlling one or more vehicle systems; and to a vehicle.

BACKGROUND

It is known from U.S. 2002/0140562 to provide a system for monitoring a driver's attention to driving a vehicle. The system includes a camera having a field of view in which the driver's face is positioned. A gaze and facial pose determiner is provided to determine whether the gaze and facial pose of the driver is oriented in a forwards direction of travel of the vehicle. An object distance determiner determines a relative distance from the vehicle to an object viewed by an object monitoring camera. An alarm can notify the driver that the gaze and facial pose are not oriented in the forward direction of travel of the vehicle.

At least in certain aspects, the present invention seeks to provide improved control of the vehicle systems.

SUMMARY OF THE INVENTION

Aspects of the present invention relate to a method of controlling one or more vehicle systems; to a control apparatus for controlling one or more vehicle systems; and to a vehicle as set out in the appended claims.

According to a further aspect of the present invention there is provided a method of controlling output of a notification to a driver in a vehicle cabin, the method comprising:
  using at least one sensor to monitor the driver to identify a driver distracted state;
  identifying which one of a plurality of areas of interest in the vehicle cabin the driver is currently looking at; and
  displaying a visual notification in a display region disposed proximal to or coincident with the identified area in dependence on identification of said driver distracted state.

Said visual notification can be only output to the display region proximal to or coincident with the identified area. Said visual notification can be displayed on a display proximal to or coincident with the identified area; or said visual notification can be projected onto a surface proximal to or coincident with the identified area.

Identifying the region in the vehicle cabin can comprise generating a virtual projection in three-dimensional space representative of a line of sight of the driver and determining which one of a plurality of areas of interest is intersected by the virtual projection. Generating the virtual projection can comprise determining a depth dimension in addition to other spatial dimensions from information received from the sensor.

Using at least one sensor can comprise using a stereo image sensor.

Identifying the driver distracted state can comprise measuring an uninterrupted time period when the driver is looking at said area. Identifying the driver distracted state can comprise measuring a cumulative time period when the driver repeatedly looks at said area and/or a frequency with which the driver repeatedly looks at said area.

A time threshold can be defined for each of the plurality of areas; and/or a frequency threshold can be defined for each of the plurality of areas. Each time threshold and/or frequency threshold can vary dependent upon at least one dynamic vehicle parameter, and/or at least one external parameter, and/or where the driver is looking within the vehicle cabin.

The visual notification can contextually represent a dynamic vehicle parameter and/or an external parameter. The visual notification can contextually represent a changed or atypical dynamic vehicle parameter and/or external parameter.

According to a further aspect of the present invention there is provided a control apparatus for controlling output of a notification to a driver in a vehicle cabin, the control apparatus comprising:
  at least one sensor for monitoring a driver of a vehicle; and
  one or more processors configured to analyse data output from said at least one sensor to identify a driver distracted state and to identify which one of a plurality of areas of interest in the vehicle cabin the driver is currently looking at; and
  a controller for outputting a control signal to cause a visual notification to be displayed in a display region proximal to or coincident with the identified area in dependence on identification of said driver distracted state.

Said control signal can cause said visual notification to be displayed only at or proximal to the identified area.

Said control signal can be configured to control a display proximal to or coincident with the identified area to display said visual notification, or to control a projector to project said visual notification onto a surface proximal to or coincident with the identified area.

The one or more processors can be configured to generate a virtual projection in three-dimensional space representative of a line of sight of the driver and to determine which one of a plurality of areas of interest is intersected by the virtual projection to identify said region where the driver is currently looking. Generating the virtual projection can comprise determining a depth dimension in addition to other spatial dimensions from information received from the sensor.

The at least one sensor can comprise a stereo image sensor.

Identifying the driver distracted state can comprise measuring an uninterrupted time period when the driver is looking at said area. Identifying the driver distracted state can comprise measuring a cumulative time period when the driver repeatedly looks at said area and/or a frequency with which the driver repeatedly looks at said area.

A time threshold can be defined for each of the plurality of areas; and/or a frequency threshold can be defined for each of the plurality of areas. Each time threshold and/or frequency threshold can vary dependent upon at least one dynamic vehicle parameter, and/or at least one external parameter, and/or where the driver is looking within the vehicle cabin.

The visual notification can contextually represent a dynamic vehicle parameter and/or external parameter. The visual notification can contextually represent a changed or atypical dynamic vehicle parameter and/or external parameter.

According to a further aspect of the present invention there is provided a method of controlling one or more vehicle systems, the method comprising:
using at least one sensor to monitor a driver to identify a driver distracted state;
determining which one of a plurality of areas of interest the driver is currently looking at; and
inhibiting one or more functions of at least a first vehicle system associated with said area in dependence on identification of said driver distracted state.

The one or more functions of the first vehicle system can be inhibited when it is determined that the driver is looking at said first vehicle system. Identifying the driver distracted state can comprise monitoring when the driver is looking at said first vehicle system.

Identifying the driver distracted state can comprises measuring an uninterrupted time period when the driver is looking at said first vehicle system. Identifying the driver distracted state can comprise measuring a cumulative time period when the driver repeatedly looks at said first vehicle system and/or a frequency with which the driver repeatedly looks at said first vehicle system. The driver distracted state can be identified when a measured time exceeds a first time threshold defined for said first vehicle system; and/or a measured frequency exceeds a first frequency threshold defined for said first vehicle system.

The method can comprise generating a virtual projection in three-dimensional space representative of a line of sight of the driver and determining which one of a plurality of areas of interest are intersected by the virtual projection to determine which vehicle system the driver is currently looking at. Generating the virtual projection can comprise determining a depth dimension in addition to other spatial dimensions from information received from the sensor. The method can comprise determining that the driver is looking at said first vehicle system when the virtual projection intersects a first area of interest associated with the first vehicle system.

The sensor can comprise a stereo image sensor.

Each of said plurality of areas of interest can be associated with a respective vehicle system. A time threshold can be defined for each said respective vehicle system; and/or a frequency threshold is defined for each said respective vehicle system. Each time threshold and/or frequency threshold can vary dependent upon at least one dynamic vehicle parameter, and/or at least one external parameter, and/or where the driver is looking within the vehicle cabin.

The method can further comprise displaying a visual notification to contextually represent a dynamic vehicle parameter and/or an external parameter. The visual notification can contextually represent a changed or atypical dynamic vehicle parameter and/or external parameter.

According to a still further aspect of the present invention there is provided a control apparatus for controlling one or more vehicle systems, the apparatus comprising:
at least one sensor for monitoring a driver of a vehicle;
one or more processors configured to analyse data output from said at least one sensor to identify a driver distracted state and determine which one of a plurality of areas of interest the driver is currently looking at; and
a controller configured to inhibit one or more functions of at least a first vehicle system associated with said area in dependence on identification of said driver distracted state.

The controller can be configured to inhibit said one or more functions of the first vehicle system when the one or more processors determine that the driver is looking at said first vehicle system.

Said one or more processors can be configured to identify the driver distracted state by monitoring when the driver is looking at said first vehicle system. Said one or more processors can be configured to identify the driver distracted state by measuring a cumulative time period when the driver repeatedly looks at said first vehicle system and/or a frequency with which the driver looks at said first vehicle system.

The control apparatus can comprise memory to store definitions of a plurality of areas of interest each associated with a respective vehicle system, said one or more processors being configured to generate a virtual projection in three-dimensional space representative of a line of sight of the driver and to determine which one of the plurality of areas of interest is intersected by said virtual projection. Said one or more processors can be configured to determine which vehicle system the driver is looking at by identifying which of the plurality of areas of interest is intersected by the virtual projection. Generating the virtual projection can comprise determining a depth dimension in addition to other spatial dimensions from information received from the sensor.

Said memory can store a time threshold and/or a frequency threshold associated with each of said plurality of areas of interest, the one or more processors being configured to identify the driver distracted state based on said stored time thresholds and/or said stored frequency thresholds.

The sensor can comprise a stereo image sensor.

Each time threshold and/or frequency threshold can vary dependent upon at least one dynamic vehicle parameter, and/or at least one external parameter, and/or where the driver is looking within the vehicle cabin.

The control apparatus can be further configured to enable display of a visual notification to contextually represent a dynamic vehicle parameter and/or external parameter. The visual notification can contextually represent a changed or atypical dynamic vehicle parameter and/or external parameter.

According to a further aspect of the present invention there is provided a method of controlling one or more vehicle systems, the method comprising:
using at least one sensor to monitor a driver to identify a driver distracted state; and
inhibiting one or more functions of at least a first vehicle system in dependence on identification of said driver distracted state. The at least one sensor may monitor the driver to identify when the driver is exhibiting signs of being distracted from driving the vehicle. When the driver distracted state is identified, one or more functions of at least said first vehicle system may be inhibited. The driver may be prompted to focus on driving the vehicle.

The method can comprise identifying which vehicle system is being looked at by the driver and inhibiting the one or more functions of that vehicle system. The method can comprise identifying the first vehicle system from a plurality of vehicle systems. The first vehicle system can be identified as the vehicle system at which the driver is looking. The one or more functions of the first vehicle system can be inhibited when it is determined that the driver is looking at said first vehicle system when the driver distracted state is identified.

Identifying the driver distracted state can comprise identifying an eyes off-road event (i.e. when the driver is not looking at the road). The driver distracted state can be identified when the eyes off-road event has been detected for a time period greater than a predefined threshold. The function(s) of a plurality of said vehicle systems can be inhibited if the eyes off-road event is identified.

Identifying the driver distracted state can comprise identifying when the driver is looking at the first vehicle system. Identifying the driver distracted state can comprise measuring a time period when the driver is looking at said first vehicle system. The time period can be a continuous (i.e. uninterrupted) time period or a cumulative time period. The measured time period can be reset to zero when the at least one sensor determines that the driver has looked at the road ahead for a predetermined time period. Alternatively, or in addition, identifying the driver distracted state can comprise determining a frequency with which the driver looks at said first vehicle system. The driver distracted state can be identified when the measured time exceeds a first time threshold defined for said first vehicle system; and/or the frequency exceeds a first frequency threshold defined for said first vehicle system.

The first vehicle system can comprise a first display screen and/or a first control panel associated with said first vehicle system.

The method can comprise generating a virtual projection representative of a line of sight of the driver and determining which one of a plurality of areas of interest are intersected by the virtual projection. Each of said plurality of areas of interest can be associated with a respective vehicle system. The vehicle system that is distracting the driver can be identified by determining which area of interest is intersected by the virtual projection. The one or more function(s) of the identified vehicle system can be inhibited to help remove or lower the distraction caused to the driver. The method can comprise determining that the driver is looking at said first vehicle system when the virtual projection intersects a first area of interest associated with the first vehicle system. The first area of interest can be identified from the plurality of areas of interest.

A time threshold can be defined for each said respective vehicle system; and/or a frequency threshold can be defined for each said respective vehicle system. The time threshold and/or the frequency threshold can be the same for each vehicle system or can be different.

The method can comprise inhibiting one or more functions of a second vehicle system in dependence on identification of said driver distracted state. The function(s) of the second vehicle system can be inhibited when it is determined that the driver is looking at the second vehicle system when the driver distracted state is identified. Identifying the driver distracted state can comprise identifying when the driver is looking at a second area of interest associated with the second vehicle system. Optionally, one or more functions of both the first vehicle system and the second vehicle system could be inhibited in dependence on identification of said driver distracted state.

The at least one sensor can be an image sensor and the method can comprise analysing image data received from said at least one image sensor. The image sensor can be an infra-red (or near infra-red) sensor or an optical light sensor. The method can comprise analysing the image data to identify said driver distracted state.

According to a further aspect of the present invention there is provided a method of controlling output of a notification to a driver in a vehicle cabin, the method comprising:
  using at least one sensor to monitor the driver to identify a driver distracted state;
  identifying an area in the vehicle cabin where the driver is currently looking; and
  displaying a visual notification in a display region disposed proximal to or coincident with the identified area in dependence on identification of said driver distracted state. The area where the driver is currently looking can be identified with reference to a determined line of sight or gaze direction of the driver.

The visual notification can be output only to the display region proximal to or coincident with the identified area. The visual notification can be output to a display, such as a screen, disposed proximal to or coincident with the identified area. The display region can be defined by at least a portion of the display. Alternatively, said visual notification can be projected onto a surface disposed proximal to or coincident with the identified area.

Identifying the region in the vehicle cabin where the driver is looking can comprise generating a virtual projection representative of a line of sight of the driver and determining which one of a plurality of areas of interest is intersected by the virtual projection. The identified area in the vehicle cabin can correspond to the area of interest.

According to a further aspect of the present invention there is provided a control unit comprising a processor configured to perform the method described herein.

According to a still further aspect of the present invention there is provided a control apparatus for controlling one or more vehicle systems, the apparatus comprising:
  at least one sensor for monitoring a driver of a vehicle;
  one or more processors configured to analyse data output from said at least one sensor to identify a driver distracted state; and
  a controller configured to inhibit one or more functions of at least a first vehicle system in dependence on identification of said driver distracted state.

The one or more processors can be configured to identify said first vehicle system from a plurality of vehicle systems. The first vehicle system can be identified as the vehicle system at which the driver is currently looking. The controller can be configured to inhibit said one or more functions of the first vehicle system when the one or more processors determine that the driver is looking at said first vehicle system.

The one or more processors can be configured to identify the driver distracted state by identifying when the driver is looking at said first vehicle system. The one or more processors can be configured to identify the driver distracted state by measuring a time period when the driver is looking at said first vehicle system and/or a frequency with which the driver looks at said first vehicle system. The time period can be a continuous (i.e. uninterrupted) time period or a cumulative time period.

The first vehicle system can comprise a first display screen and/or a first control panel. Alternatively, the first vehicle system can comprise a set of controls, for example relating to a satellite navigation system or an infotainment system.

The one or more processors can be coupled to memory, the memory storing definitions of a plurality of areas of interest. Each of said plurality of areas of interest can be associated with a respective vehicle system. The one or more processors can be configured to identify said first area of interest from said plurality of areas of interest.

The memory can store a time threshold and/or a frequency threshold associated with each of said plurality of areas of interest. The one or more processors can be configured to identify the driver distracted state based on said time threshold and/or said frequency threshold.

The at least one sensor can be an image sensor operative to generate image data. The image sensor can be an infra-red (or near infra-red) sensor or an optical light sensor. The one or more processors can analyse the image data to identify said driver distracted state.

The one or more processors can be configured to generate a virtual projection representative of a line of sight of the driver to identify at which one of said plurality of areas of interest the driver is currently looking. The one or more processors can be configured to determine which area of interest is intersected by said virtual projection to determine where the driver is looking. The one or more processors can thereby determine at which vehicle system the driver is currently looking. The virtual projection can be generated using head tracking and/or eye tracking. The one or more processors can identify which one of a plurality of vehicle systems is distracting the driver and inhibit one or more functions of that particular vehicle system.

The one or more processors can be configured to inhibit one or more functions of a second vehicle system in dependence on identification of said driver distracted state. The function(s) of the second vehicle system can be inhibited when it is determined that the driver is looking at the second vehicle system. The one or more processors can be configured to identify the driver distracted state by identifying when the driver is looking at a second area of interest associated with said second vehicle system. Optionally, one or more functions of both the first vehicle system and the second vehicle system could be inhibited in dependence on identification of said driver distracted state.

According to a further aspect of the present invention there is provided a control apparatus for controlling output of a notification to a driver in a vehicle cabin, the control apparatus comprising:
at least one sensor for monitoring a driver of a vehicle; and
one or more processors configured to analyse data output from said at least one sensor to identify a driver distracted state and to identify an area in the vehicle cabin where the driver is currently looking; and
a controller for outputting a control signal to cause a visual notification to be displayed in a display region proximal to or coincident with the identified area in dependence on identification of said driver distracted state.

The control signal can cause said visual notification to be displayed only at or proximal to the identified area. The control signal can be configured to control a display, such as a screen, to display said visual notification, the display being disposed proximal to or coincident with the identified area. In this arrangement, the display region can be defined by at least a portion of the display. Alternatively, the control signal can be configured to control a projector to project said visual notification onto a surface proximal to or coincident with the identified area. In this arrangement, the display region can be defined by a surface in the vehicle cabin onto which the visual notification to be displayed can be projected.

The display on which the visual notification is displayed can be associated with the identified area of interest. Alternatively, the control signal can be operative to control a projector to project said visual notification. The projector can be configured to project the visual notification onto a surface associated with the identified area of interest. The projector can be configurable, for example to adjust where the visual notification is projected.

The control signal can comprise display data to define where the visual notification is to be displayed, for example on which screen the visual notification is to be displayed and/or where on a screen the visual notification is to be displayed. The control signal can comprise display data to define on which surface the visual notification is to be projected and/or where on a surface the visual notification is to be projected.

The one or more processors can be configured to generate a virtual projection representative of a line of sight of the driver and to determine which one of a plurality of areas of interest is intersected by the virtual projection to identify said region where the driver is currently looking. A display, such as a screen, can be associated with the determined area or interest.

According to a still further aspect of the present invention there is provided a vehicle comprising a control apparatus as described herein. In certain embodiments, the vehicle can comprise a display and/or a projector for displaying the visual notification.

The controller described herein can be integrated into the one or more processors; or the controller can be a separate control unit, for example comprising at least one electronic microprocessor.

The term processor is used herein to refer to one or more electronic microprocessors adapted to perform computational instructions. The processor(s) can be configured to execute a set of computational instructions which cause the processor(s) to implement the method(s) described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

A control apparatus 1 for a vehicle V in accordance with an embodiment of the present invention will now be described with reference to the accompanying Figures. The control apparatus 1 is configured to control on-board vehicle systems in dependence on a determined driver distracted state of the driver. In particular, the control apparatus 1 is configured to inhibit one or more functions when it is determined that a driver D of the vehicle V is in a distracted state (i.e. when the driver D is not giving due attention to the task of driving the vehicle V).

Figure 1:
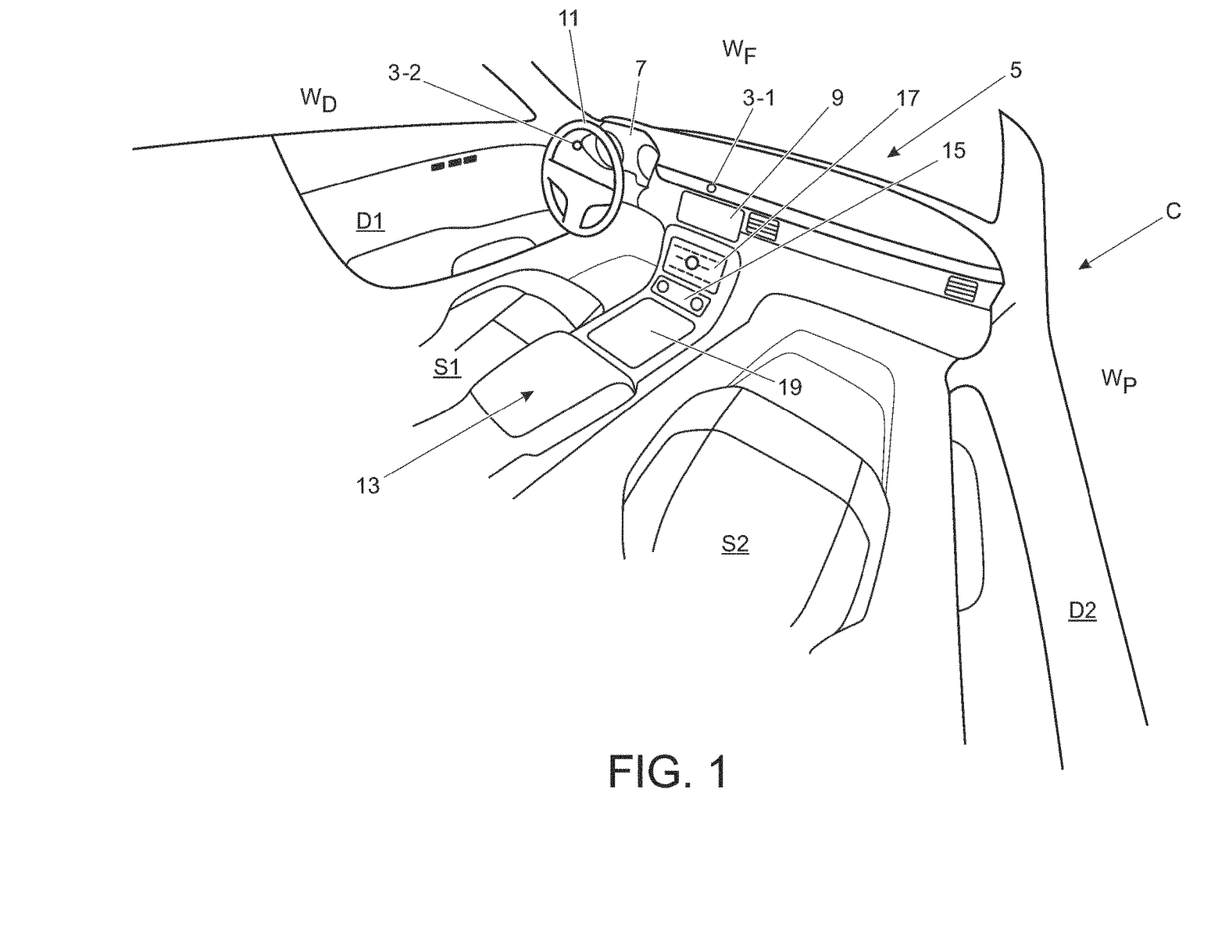
FIG. 1 is a perspective view of a front portion of a vehicle cabin incorporating a control apparatus according to an embodiment of the present invention.

A perspective interior view of a front portion of a vehicle cabin C having first and second image sensors 3-1, 3-2 is shown in FIG. 1. The cabin C accommodates the vehicle occupants, typically the driver D and one or more passengers, and includes various user interfaces for operating vehicle systems. The front portion of the cabin C is defined by the interior of the vehicle V that is housed between a roof portion, a front windscreen $W_F$, a rear windscreen $W_R$, driver and passenger side doors D1, D2, and a vehicle floor (not shown). The cabin C comprises a driver seat S1 for seating the driver and a passenger seat S2 for seating the passenger. The driver seat S1 is accordingly located on a driver side and the passenger seat S2 is located opposite on a passenger side. A driver side window $W_D$ is provided in the driver side door D1; and a passenger side window $W_P$ is provided in the passenger side door D2. It will be appreciated that the invention can be applied in left-and right-hand drive vehicles by changing the location of the image sensors 3-1, 3-2.

A dashboard 5 is located below the front windscreen $W_F$ and extends between the driver and passenger side doors D1, D2. The dashboard 5 comprises an instrument display panel 7 (in the form of an instrument cluster comprising a tachometer, speedometer, and fuel gauge) and an infotainment system display panel 9 (which may also function as a satellite navigation display), which is associated with an infotainment system. The display screen can, for example, comprise a touch-screen. A steering wheel 11 is provided on the driver side of the dashboard 9 to steer the vehicle V. The steering wheel 11 is provided with auxiliary controls (not shown), which allow control of the infotainment system and can also enable selective operational controls, such as activating/deactivating a cruise control function. The driver side and the passenger side of the cabin C are partially separated by a central console 13. The central console 13 comprises a gear selector 15 for operating transmission changes of the vehicle V; and controls 17 for the infotainment system. The central console 13 also comprises a storage compartment 19.

Figure 2:
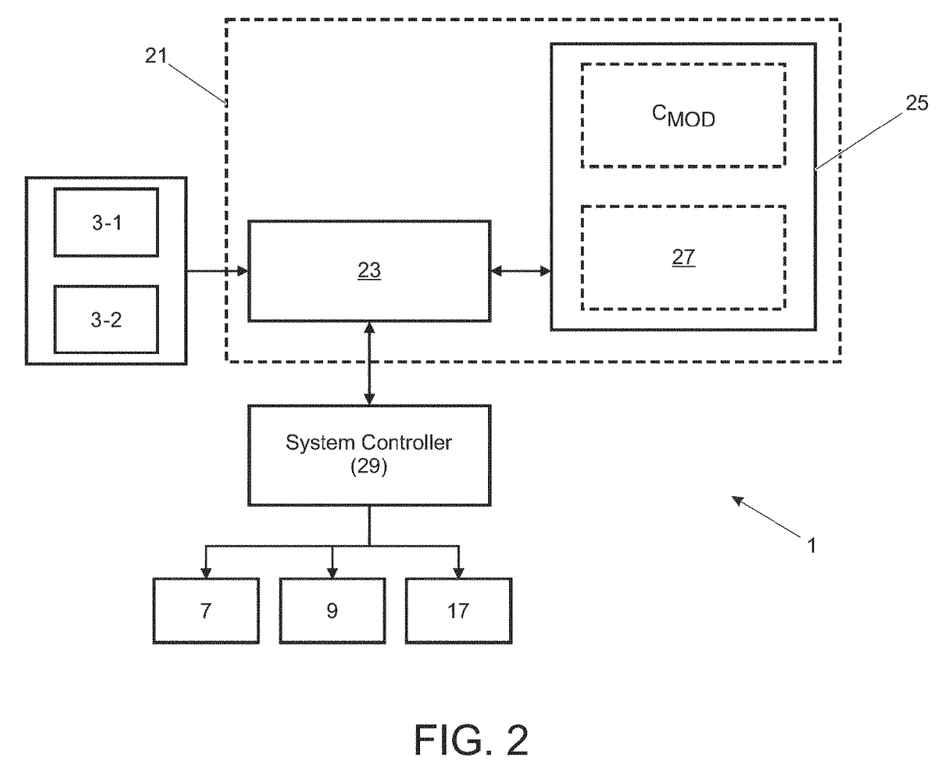
FIG. 2 is a schematic block diagram of a control apparatus according to an embodiment of the present invention.

FIG. 2 is a schematic block diagram of the control apparatus 1. The control apparatus 1 comprises a driver monitor 21 having one or more processors 23 (only one is shown for simplicity of explanation); and one or more memories 25 (only one memory module is shown for simplicity) having computer code 27 stored thereon. The control apparatus 1 also comprises the first and second image sensors 3-1, 3-2 which are coupled to the driver monitor 21. A controller in the form of a vehicle system controller 29 is coupled to the driver monitor 21. The vehicle system controller 29 is adapted to control the operation of one or more vehicle systems in dependence on an output signal from the driver monitor 21, as described in more detail below. The vehicle system controller 29 can comprise one or more processors for performing computational functions. In alternate embodiments, the driver monitor 21 and the vehicle system controller 29 could be combined.

The one or more memories 25 store a three-dimensional model $C_{MOD}$ of the vehicle cabin C. The three-dimensional model $C_{MOD}$ defines the key features of the inside of the cabin C. At least in certain embodiments, the three-dimensional model $C_{MOD}$ can be derived from a Computer-Aided Design (CAD) model of the vehicle V. In this manner, portions of the interior cabin C can be mapped onto a virtual vehicle cabin defined by the three-dimensional model $C_{MOD}$. The interior virtual vehicle cabin comprises a plurality of predefined areas of interest $A_n$ (where n is a whole number).

The first and second image sensors 3-1, 3-2 each comprise a driver-facing camera. The first and second image sensors 3-1, 3-2 can detect infra-red (or near infra-red) to implement an eye-tracking function. In a variant, the image sensors 3-1, 3-2 could detect light at a visible wavelength. However, the use of image sensors 3-1, 3-2 to detect light in the visible spectrum may require cabin lighting to provide illumination in low light conditions.

Figure 3:
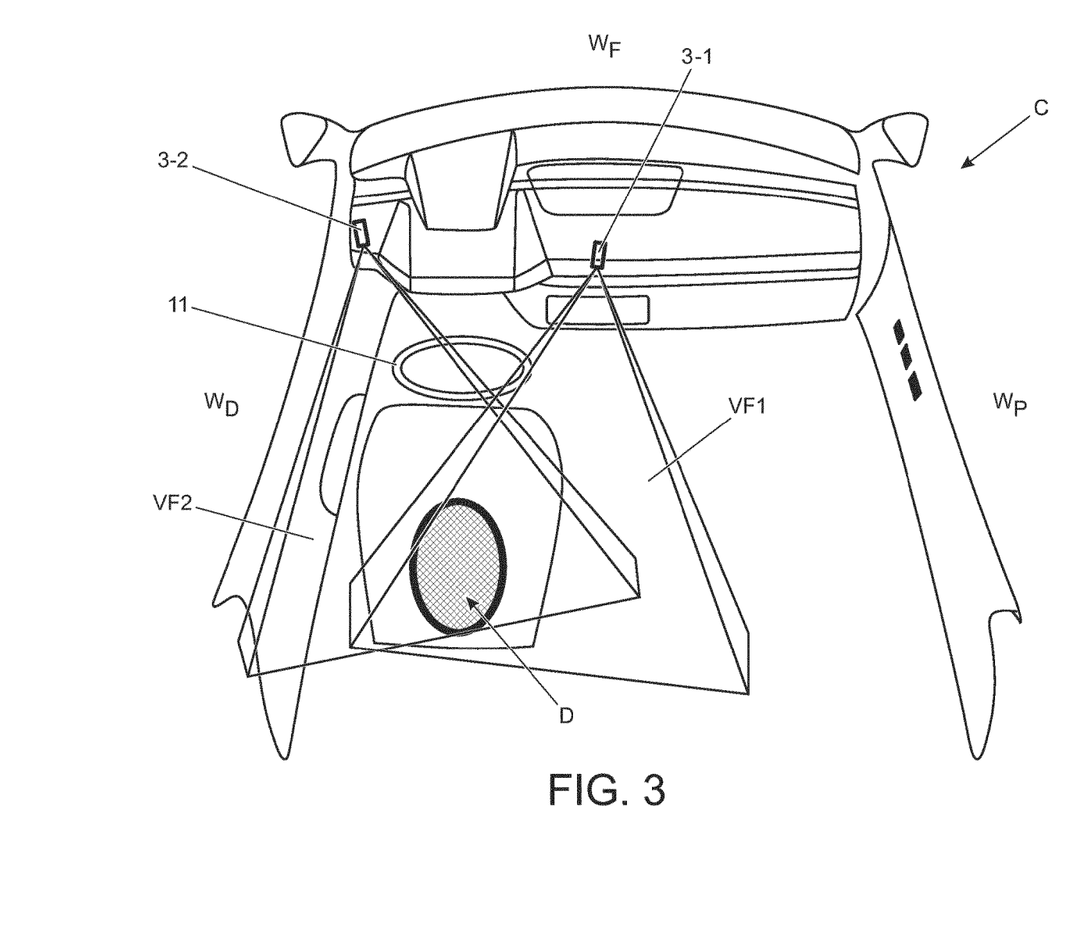
FIG. 3 is a schematic diagram illustrating the arrangement of a pair of image sensors for monitoring a driver in accordance with an embodiment of the present invention.

As shown in FIG. 3, the first image sensor 3-1 is located in the dashboard 9 below a centre-point of the front windscreen $W_F$, and the second image sensor 3-2 is located near a bottom corner of the front windscreen $W_F$ on the driver side of the vehicle V. The first and second image sensors 3-1, 3-2 are arranged to face a driver D of the vehicle V to enable the driver D to be monitored. The field of view matrix of each of the first and second image sensors 3-1, 3-2 is illustrated in FIG. 3 by respective view frustums VF1, VF2. In operation, the first and second image sensors 3-1, 3-2 each generate image data which is output to an image processor. The image sensors 3-1, 3-2 are configured to detect the driver D and can determine a point of origin O in three-dimensional coordinate space based on the position of the driver's head. The orientation of the driver's head can also be determined more accurately to model the gaze direction and/or to determine an approximate eye position for use by an eye-tracking mechanism. The position and orientation of the driver's head are referred to herein collectively as the "head pose". The eye-tracking mechanism tracks the driver's eyes so as to determine an angular direction of the driver's target line of sight with respect to a fixed reference (known as "gaze direction").

The head orientation and the gaze direction are calculated with respect to the stored model $C_{MOD}$, as described in more detail with reference to FIGS. 4 and 5. The model $C_{MOD}$ comprises one or more predefined areas of interest $A_n$ (where n is a whole number) corresponding to vehicle systems disposed within the cabin C. The areas of interest $A_n$ are defined as elements within the model $C_{MOD}$. The reference numbers of the associated feature of the cabin C are used herein as a subscript to identify the corresponding area of interest $A_n$ in the model $C_{MOD}$. An area of interest $A_7$ corresponds to the instrument display panel 7, an area of interest $A_9$ corresponds to the infotainment system display panel 9, and an area of interest $A_{17}$ corresponds to the infotainment system controls 17. In addition, the model $C_{MOD}$ can comprise one or more predefined areas of interest $A_n$ which do not relate to vehicle systems. Notably, the model $C_{MOD}$ can comprise an area of interest $A_{WF}$ corresponding to a front windscreen $W_F$.

Using the determined point of origin O and gaze direction, a virtual projection P (which can be referred to as a "gaze vector") is then determined so as to represent the driver's line of sight with respect to the cabin C. The virtual projection P is integrated with the three-dimensional model $C_{MOD}$ of the cabin C to determine where the driver is looking. The driver monitor 21 is configured to analyse the resulting data to identify when the driver D is in a driver distracted state. In particular, the driver monitor 21 is configured to track the virtual projection P to monitor where the driver D is looking while they are driving the vehicle V.

The driver monitor 21 implements a timer to measure the period of time during which the virtual projection P intersects one of the areas of interest $A_n$ defined within the cabin C. If the measured time exceeds a predefined time threshold, the driver monitor 21 determines that the driver D is in a driver distracted state. The timer can be configured to measure a continuous period of time consisting of a single uninterrupted intersection of the virtual projection P with one of the areas of interest $A_n$, for example representing a scenario whereby the driver D focuses on a particular vehicle system. Alternatively, the time can be configured to measure a cumulative period of time comprising multiple intersections of the virtual projection P with one of the areas of interest $A_n$, for example representing a scenario whereby the driver D repeatedly looks at a particular vehicle system. The measured period of time can be reset to zero if the driver monitor 21 determines that the driver D has looked through the front windscreen $W_F$ for a predefined time period.

The timer can independently measure the period of time during which the virtual projection P intersects each area of interest $A_n$. The driver monitor 21 identifies that the driver D is in a driver distracted state when the measured period of time for one of the areas of interest $A_n$ exceeds the predefined time threshold for that particular area of interest $A_n$. Alternatively, or in addition, the timer can measure the period of time during which the virtual projection P intersects any of the areas of interest $A_n$. The driver monitor 21 identifies that the driver D is in a driver distracted state when the measured time when the virtual projection P intersects any of the areas of interest $A_n$ exceeds a maximum predefined time threshold, for example 4 seconds.

Alternatively, or in addition, the driver monitor 21 can comprise a counter which, in use, counts the number of times that the virtual projection P intersects one of the areas of interest $A_n$ within a prescribed time period. The driver monitor 21 can thereby determine the frequency with which the virtual projection P intersects one of the areas of interest $A_n$. If the frequency exceeds a predefined frequency threshold, the driver monitor 21 determines that the driver D is in a driver distracted state.

The driver monitor 21 can determine that the driver is no longer in a driver distracted state when the virtual projection P intersects the area of interest $A_{WF}$ corresponding to the front windscreen $W_F$ for a prescribed time period, for example 5 seconds.

The time threshold which is defined to identify when the driver is in a driver distracted state can be the same for all of the areas of interest $A_n$. In the present embodiment, however, different time thresholds are defined for different areas of interest $A_n$. The time period elapsed before the driver monitor 21 determines that the driver D is in a driver distracted state thereby varies depending on where the driver D is looking within the cabin C. This may correspond to a varying time required for the driver to return their gaze from where the driver is looking to an area of interest corresponding to a non-distracted state, such as $A_{WF}$. A time threshold of 3 seconds is defined for the area of interest $A_7$ corresponding to the instrument display panel 7; and a time threshold of 1 second is defined for the area of interest $A_9$ corresponding to the infotainment system display panel 9 and also the area of interest $A_{17}$ corresponding to the infotainment system controls 17.

The time thresholds can be fixed. Alternatively, the time thresholds can be varied in dependence on a dynamic vehicle parameter, for example the vehicle speed. The predefined time periods could be reduced as the vehicle speed increases and vice versa. Alternatively, or in addition, the time thresholds could be adjusted depending on external parameters. External parameters can comprise parameters that are dependent upon factors external to the vehicle, such as a category of road on which the vehicle V is travelling (for example, the time thresholds can be lower when the vehicle is on a secondary ("B") road than when it is on a primary ("A") road or on a motorway); the road conditions (for example, the time thresholds can be lower when the roads are wet than when they are dry); and the proximity of other vehicles and/or the volume of traffic (for example, the time thresholds can be lower when an adaptive cruise control (ACC) detects one or more other vehicles proximal to the vehicle B). Another external parameter can comprise the proximity of the edge of a lane (for example, the thresholds can be lower when lane departure is detected).

The driver monitor 21 is configured to publish the driver distracted state to a communications area network (CAN) bus (or other communication BUS). The vehicle system controller 29 is operative to inhibit certain functions in dependence on the published distraction level. In particular, the vehicle system controller 29 is operative to temporarily inhibit (or disable) at least certain functionality of the vehicle system associated with the area of interest $A_n$ which is currently intersected by the virtual projection P. Thus, in use, functionality of a given vehicle system can be inhibited when the driver monitor 21 determines that the driver O has been looking at that particular vehicle system for a period of time greater than a predefined time period specified for that vehicle system. The vehicle system controller 29 can optionally also output a warning or notification to that vehicle system, for example to display a message on-screen to notify the driver D.

When the driver D is in a driver distracted state (as determined by the driver monitor 21), the vehicle system controller 29 temporarily inhibits one or more functions associated with the vehicle system at which the driver D is currently looking. It will be appreciated that any functions essential to the safe operation of the vehicle V are unaffected by the vehicle system controller 29 and would be maintained irrespective of the identified driver distracted state. When the vehicle system controller 29 inhibits the function of the instrument display panel 7 or the infotainment system display panel 9, at least a portion of the display is greyed out to provide the driver D with a visual indication that the functionality has been inhibited. A warning message or alert is optionally also displayed on the instrument display panel 7 or the infotainment system display panel 9 to inform the driver that the functionality has been limited due to the identified driver distracted state of the driver O. When the vehicle system controller 29 inhibits the function of the infotainment system controls 17, the controls are inhibited for a defined time period or until the driver monitor 21 determines that the driver D is no longer in a driver distracted state.

The virtual model $C_{MOD}$ has been described as comprising areas of interest $A_n$ corresponding to the instrument display panel 7, the infotainment system display panel 9 and the infotainment system controls 17. It will be appreciated that that virtual model $C_{MOD}$ can define additional areas of interest $A_n$. For example the areas of interest $A_n$ can correspond to one or more of said storage compartments 19. The vehicle system controller 29 could, for example, dim or switch off a lamp (or LED) provided to illuminate the storage compartment 19 if the driver monitor 21 identifies that the driver D is looking at the storage compartment 19. Alternatively, or in addition, the vehicle system controller 29 could intermittently flash the lamp to provide a driver notification. Alternatively, or in addition, the vehicle system controller 29 can be arranged to control the display or projection of a warning or notification on the area on which the driver is currently focusing. The vehicle system controller 29 can be configured to control a projection device to cause a warning symbol to be projected onto the surface at which the driver is looking, for example a glove box, a passenger door control and so on. The projection device can be mounted in the vehicle cabin, for example mounted to the roof of the cabin, and optionally configured to project in multiple directions.

Figure 5:
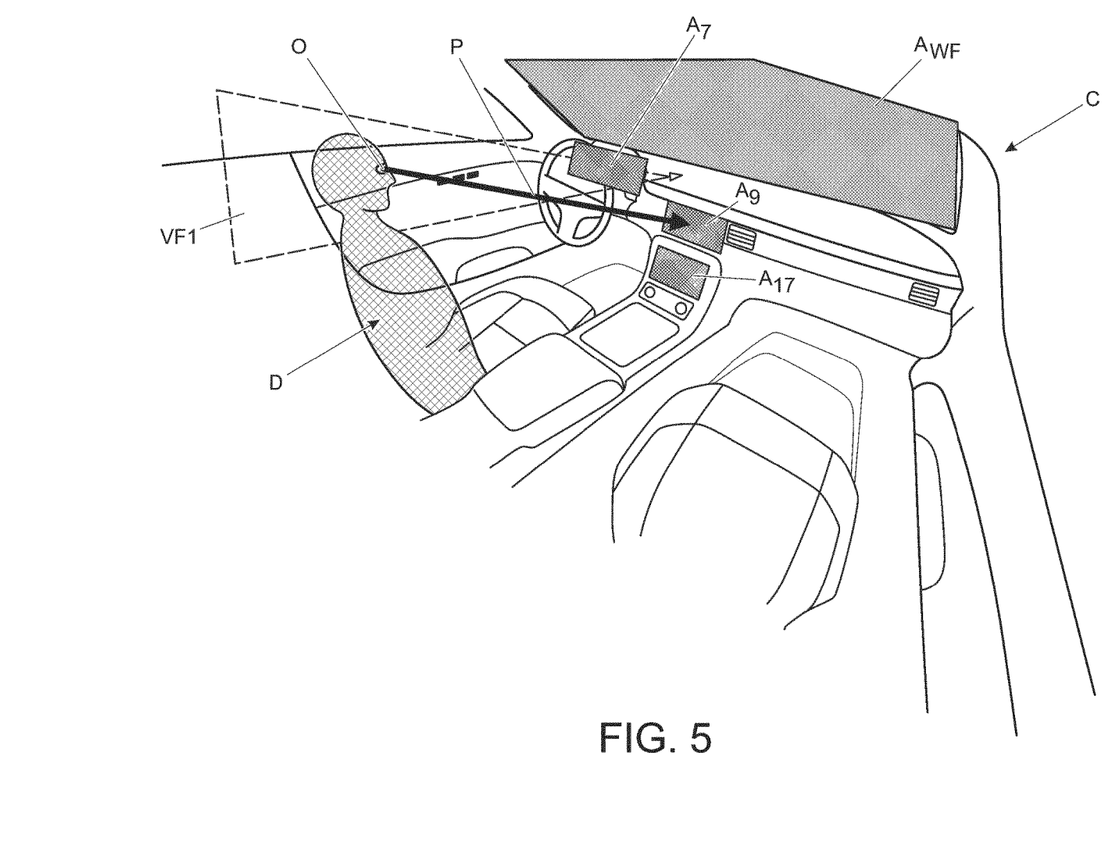
FIG. 5 illustrates the operation of the control apparatus according to an embodiment of the present invention.
Figure 6:
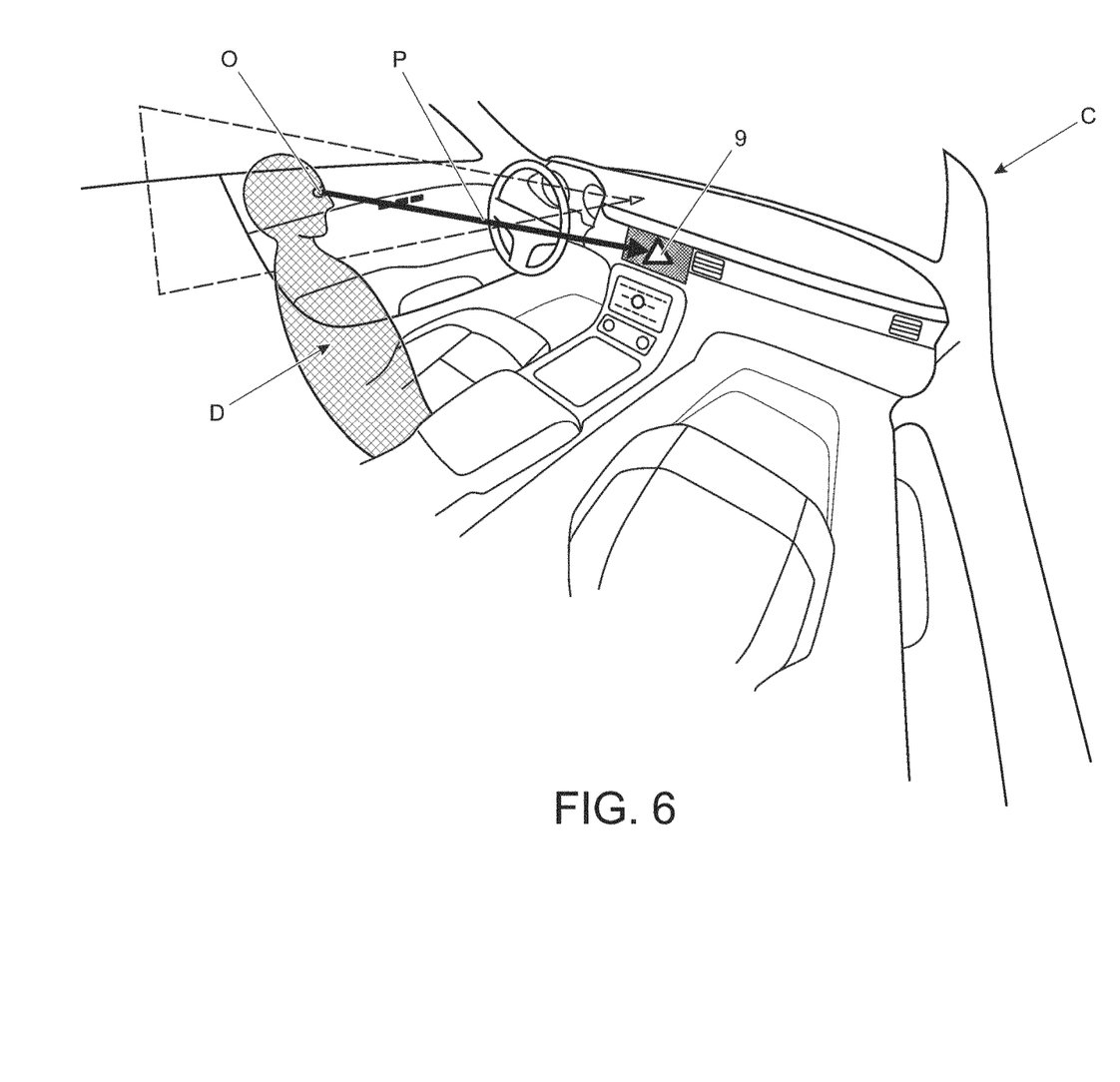
FIG. 6 illustrates the operation of the control apparatus shown in FIG. 5 to output a driver notification.

The operation of the control apparatus 1 illustrated in FIG. 2 will now be explained in detail with reference to a three-dimensional model $C_{MOD}$ illustrated in FIGS. 4, 5 and 6.

Figure 4:
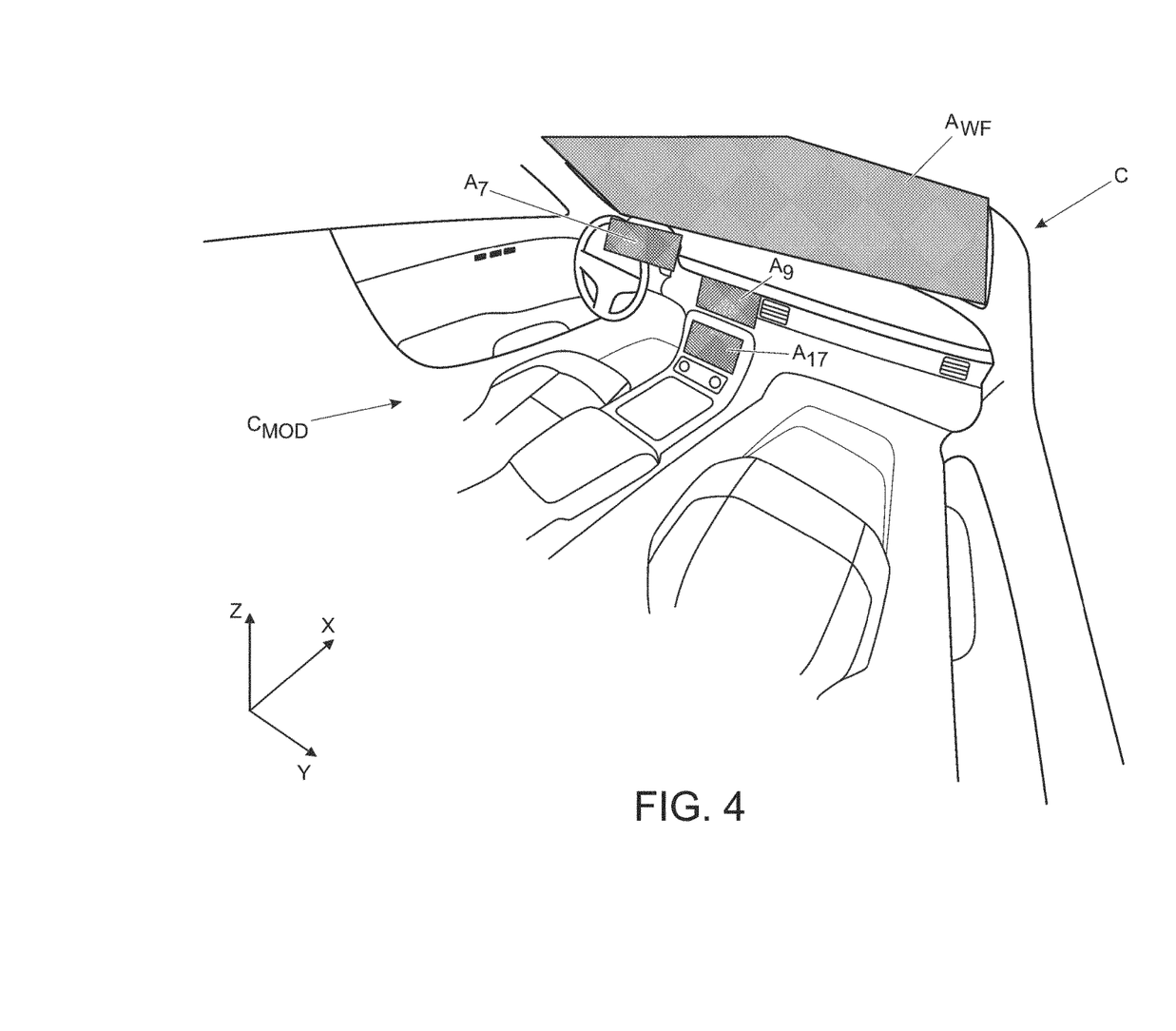
FIG. 4 illustrates a three-dimensional model of the vehicle cabin incorporating predefined areas of interest.

FIG. 4 is a schematic of the three-dimensional model $C_{MOD}$, which provides a virtual representation of the cabin C of FIG. 1. The virtual representation has been simplified for ease of explanation, however, it will be appreciated that the virtual representation will be understood to map onto the cabin C of FIG. 1 in dimension and shape so as to follow the contours of the cabin C. The three-dimensional model $C_{MOD}$ comprises a plurality of said predefined areas of interest $A_n$ each associated with a different one of said visual zones relating to the cabin C. The cabin C is shown in phantom in FIG. 4 to highlight the relationship between the three-dimensional model $C_{MOD}$ and the cabin C of the vehicle V. In the present embodiment, the position and orientation of each area of interest $A_n$ is defined in three dimensions within the three-dimensional model $C_{MOD}$.

In operation, the processor 23 receives image data from the image sensors 3-1, 3-2 and performs image processing in order to determine the point of origin O and a virtual projection P for the vehicle driver. The point of origin O is shown in FIG. 5 and the virtual projection P is shown to be pointing from the point of origin O towards the infotainment system display panel 9. The point of origin O is a point in three-dimensional coordinate space represented by a three-dimensional axes system (X-axis, Y-axis, Z-axis). Similarly, the virtual projection P is defined with respect to the three-dimensional axes and therefore will have an angular offset with respect to each axis. As shown in FIG. 5, the image sensors 3-1, 3-2 are used to determine the point of origin O and the virtual projection P. This information is then combined with the three-dimensional model $C_{MOD}$ to determine which said area of interest $A_n$ is currently being looking at by the user.

In more detail, the point of origin O is calculated by first using image data to identify a face of the vehicle driver, for example, using face detection algorithms or "face-tracking" as is well known in the art. Following the identification, an approximation can be made of the position and orientation of the vehicle driver's head. Image processing techniques are then used to identify eye position. Having determined the head position, orientation and eye position, the processor 23 can calculate the point of origin O in a three-dimensional space of the cabin C. The point of origin O can be chosen as a mid-point between the eyes of the vehicle driver. The point of origin O is calculated with respect to a vehicle cabin origin (not shown), which is a centre-point origin position in the cabin C. In particular, as there are two image sensors 3-1, 3-2 spaced by a known, predetermined distance, a triangulation calculation can be performed to determine the point of origin O with respect to the vehicle cabin origin. The use of the two image sensors 3-1, 3-2 allows a depth dimension to be determined in addition to other spatial dimensions. Fixed reference points for the image sensors 3-1, 3-2 can also be used to assist determining the point of origin O. Thereafter, the image sensors 3-1, 3-2 are used to perform eye tracking to determine the virtual projection P in three-dimensional space. For example, infra-red or near infra-red light can be directed towards the vehicle driver's eyes, which can reflect off the eyes to provide information about the direction in which the vehicle driver is looking. Image processing is then carried out so as to determine the virtual projection P.

The processor 23 then calculates the virtual projection P representative of a gaze vector of the vehicle driver based on the point of origin O and the virtual projection P. The virtual projection P is plotted in the three-dimensional model $C_{MOD}$ so that it initiates at the determined point of origin O and extends in the determined direction. The processor 23 then determines if the virtual projection P intersects one of the plurality of areas of interest $A_n$ defined within the three-dimensional model $C_{MOD}$. The intersected areas of interest $A_n$ correspond with a visual zone currently being viewed by the vehicle driver. The driver monitor 21 can thereby determine when the driver is looking at one of the areas of interest $A_n$ within the cabin C. In the example illustrated in FIGS. 5 and 6, the virtual projection P is intersecting the area of interest $A_9$ associated with the infotainment system display 9.

The driver monitor 21 identifies when the driver is in a driver distracted state based on the amount of time and/or frequency that the virtual projection P intersects an area of interest $A_n$ within the vehicle cabin C. If the driver monitor 21 determines that the driver is in a driver distracted state, a driver distracted signal is published to the a vehicle communication network, such as a CAN bus. In dependence on the vehicle system controller 29, one or more functions of the vehicle system associated with that area of interest $A_n$ is temporarily inhibited. In the illustrated arrangement, the driver monitor 21 determines that the driver D has been looking at the infotainment system display panel 9 for longer than 3 seconds. As illustrated in FIG. 6, the vehicle system controller 29 is prompted to inhibit functions of the infotainment system display panel 9 and to display an alert (illustrated as a triangle). Alternatively, or in addition, the vehicle system controller 29 can be configured to display image data generated by a forward-facing camera provided in the vehicle V. For example, a video image obtained from a camera disposed at the front of the vehicle V can be output to a display associated with the identified area of interest $A_n$.

The vehicle system controller 29 may be configured to display the visual notification such that it contextually represents a dynamic vehicle parameter and/or external parameter. The visual notification may contextually represent a changed or atypical dynamic vehicle parameter and/or external parameter.

The parameter may be displayed if its value changes or is atypical during the driver distraction period, otherwise a generic visual notification is displayed and/or the functionality of the display is inhibited. The parameter may change or become atypical, for example when its value exceeds a threshold, changes rapidly, and/or causes the time threshold associated with distraction to decrease.

For example if a dynamic vehicle parameter such as vehicle speed changes or is atypical during the driver distraction period, the visual notification may contextually represent the changed or atypical dynamic vehicle parameter, for example by displaying the vehicle's speed or a speed warning. If the external parameter such as lane positioning changes or is atypical during the driver distraction period, the visual notification may contextually represent the changed or atypical external parameter, for example by displaying a video image from the forward-facing camera or a lane departure warning.

Figure 7:
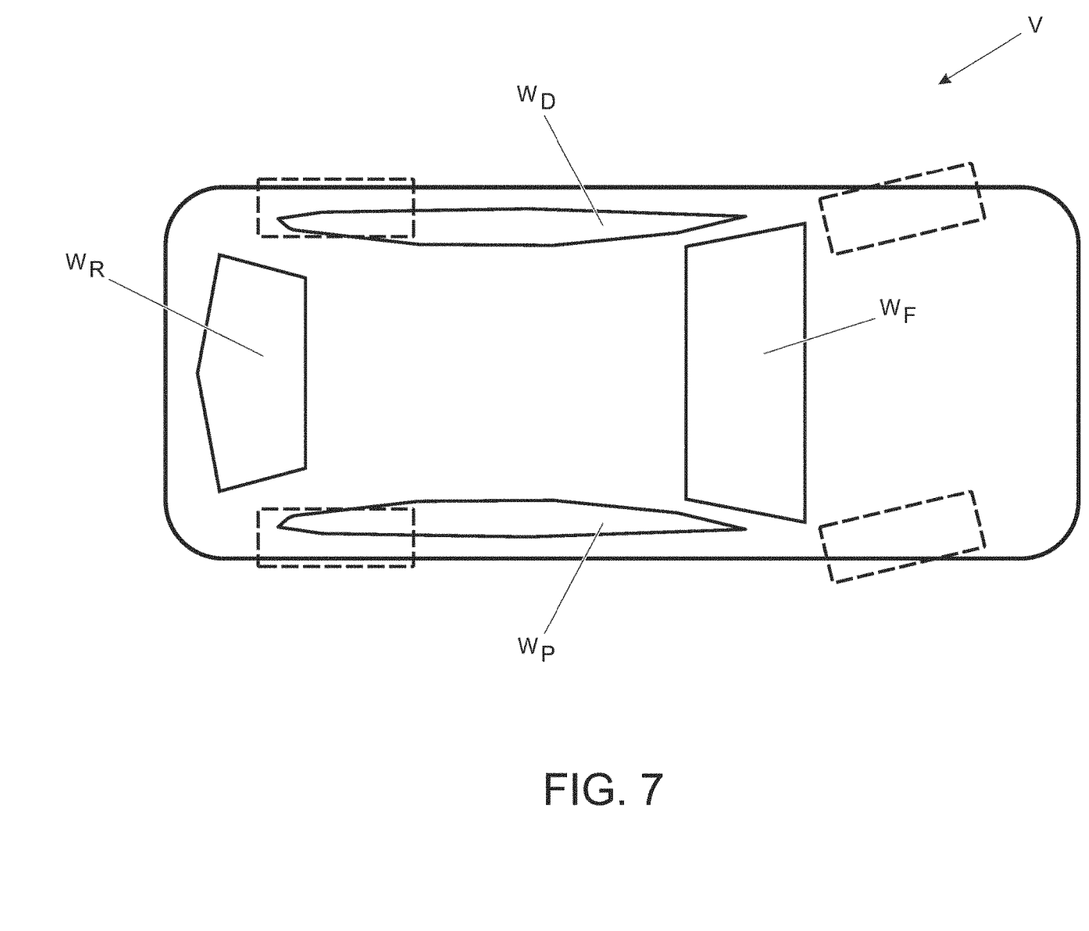
FIG. 7 is a schematic representation of a vehicle comprising the control apparatus according to an embodiment of the present invention.

The vehicle V comprising the control apparatus 1 is shown schematically in FIG. 7. The control apparatus 1 has been described as resetting driver monitoring when the driver D looks through the front windscreen $W_F$ for a predefined time period. It will be appreciated that the apparatus 1 could also function with the side windows $W_D$, $W_P$ and optionally also the rear windscreen $W_R$. The direction of travel of the vehicle V could be used as an additional control input to determine when the system is reset. Further control strategies could determine when the driver D is looking in a rear view mirror (not shown) or in one of the side mirrors of the vehicle (not shown).

It will be appreciated that various changes and modifications can be made to the control apparatus 1 described herein without departing from the scope of the invention defined herein. The control apparatus 1 has been described with reference to a three-dimensional model $C_{MOD}$ corresponding to the vehicle cabin. The model $C_{MOD}$ could be simplified, for example to define areas of interest with reference to a fixed origin.

The control apparatus 1 has been described as comprising two image sensors 3-1, 3-2. It will be appreciated that the apparatus 1 could utilise a single image sensor or a stereo image sensor. The attentiveness of the driver could be determined with reference to head pose or gaze direction.

Rather than determine the virtual projection P of the driver D, the driver monitor 21 could be arranged to determine a point of interest on a surface. The model $C_{MOD}$ can be configured to define surfaces which are used to identify when the point of interest corresponds to an eyes off-road event.

The driver monitor 21 has been described herein as identifying a driver distracted state. It will be appreciated that the driver monitor 21 could be modified to perform categorisation of the driver state. For example, in an alternate embodiment, the driver monitor 21 can be configured to identify which one of a plurality of predefined driver distraction states corresponds to a current driver state. The driver monitor 21 can comprise at least a high distraction state and a low distraction state. The distraction state could be identified in dependence on the period of time which the virtual projection P intersects an area of interest $A_n$ within the cabin C. The control implemented by the vehicle system controller 29 can be modified in dependence on the identified distraction state of the driver D. For example, a warning or notification can be output in dependence on the low distraction state and functionality can be inhibited in dependence on the high distraction state.

In all of the embodiments, the skilled person would appreciate that a frequency threshold could be defined instead of a time threshold. A frequency threshold relates to the number of times that the driver looks at said first vehicle system within a time interval.

The invention claimed is:

1. A method of controlling output of a notification to a driver in a vehicle cabin, the method comprising:
    monitoring the driver via at least one sensor to identify a driver distracted state;
    identifying which one of a plurality of areas in the vehicle cabin other than a front windscreen the driver is currently looking at, wherein the plurality of areas comprises at least a first area corresponding to a first vehicle system and a second area not overlapping the first area and corresponding to a second vehicle system; and
    displaying a visual notification in a display region proximal to or coincident with the identified area in dependence on identification of the driver distracted state.

2. The method of claim 1, wherein the visual notification is only output to the display region proximal to or coincident with the identified area.

3. The method of claim 1, wherein the visual notification is displayed on a display proximal to or coincident with the identified area, or wherein the visual notification is projected onto a surface proximal to or coincident with the identified area.

4. The method of claim 1, wherein identifying which one of the plurality of areas in the vehicle cabin other than a front windscreen the driver is currently looking at comprises generating a virtual projection in three-dimensional space representative of a line of sight of the driver and determining which one of the plurality of areas is intersected by the virtual projection.

5. The method of claim 1, further comprising determining a depth dimension in addition to other spatial dimensions from information received from the sensor to construct a three-dimensional gaze vector.

6. The method of claim 1, wherein monitoring the driver to identify the driver distracted state comprises measuring an uninterrupted time period when the driver is looking at the identified area or measuring a cumulative time period when the driver repeatedly looks at the identified area and/or a frequency with which the driver repeatedly looks at the identified area.

7. The method of claim 1, wherein a different time threshold is defined for each of the plurality of areas and/or a different frequency threshold is defined for each of the plurality of areas, wherein identification of the driver distracted state is determined by exceedance of the time threshold and/or frequency threshold corresponding to the identified area.

8. The method of claim 7, wherein each time threshold and/or frequency threshold varies dependent upon at least one dynamic vehicle parameter, and/or at least one external parameter, and/or where the driver is looking within the vehicle cabin.

9. A control apparatus for controlling output of a notification to a driver in a vehicle cabin, the control apparatus comprising:
    at least one sensor for monitoring the driver; and
    one or more processors configured to analyse data output from the at least one sensor to identify a driver distracted state and to identify which one of a plurality of areas in the vehicle cabin other than a front windscreen the driver is currently looking at, wherein the plurality of areas comprises at least a first area corresponding to a first vehicle system and a second area not overlapping the first area and corresponding to a second vehicle system; and a controller for outputting a control signal to cause a visual notification to be displayed in a display region proximal to or coincident with the identified area in dependence on identification of the driver distracted state.

10. The control apparatus of claim 9, wherein the control signal causes the visual notification to be displayed only at or proximal to the identified area.

11. The control apparatus of claim 9, wherein the control signal is configured to control a display proximal to or coincident with the identified area to display the visual notification, or to control a projector to project the visual notification onto a surface proximal to or coincident with the identified area.

12. The control apparatus of claim 9, wherein the one or more processors are configured to generate a virtual projection in three-dimensional space representative of a line of sight of the driver and to determine which one of the plurality of areas is intersected by the virtual projection to identify where the driver is currently looking.

13. The control apparatus of claim 12, wherein the one or more processors are configured to determine a depth dimension in addition to other spatial dimensions from information received from the at least one sensor to construct a three-dimensional gaze vector.

14. The control apparatus of claim 9, wherein the at least one sensor comprises a stereo image sensor.

15. The control apparatus of claim 9, wherein the one or more processors are configured to measure an uninterrupted time period when the driver is looking at the identified area, or are configured to measure a cumulative time period when the driver repeatedly looks at the identified area, and/or are configured to measure a frequency with which the driver repeatedly looks at the identified area.

16. The control apparatus of claim 9, wherein a different time threshold is defined for each of the plurality of areas and/or a different frequency threshold is defined for each of the plurality of areas, wherein identification of the driverdistracted state is determined by exceedance of the time threshold and/or frequency threshold corresponding to the identified area.

17. The control apparatus of claim 16, wherein each time threshold and/or frequency threshold varies dependent upon at least one dynamic vehicle parameter, and/or at least one external parameter, and/or where the driver is looking within the vehicle cabin.

18. A vehicle comprising the control apparatus of claim 9.

19. A method of controlling output of a notification to a driver in a vehicle cabin, the method comprising:

monitoring the driver via at least one sensor to identify a driver distracted state;

identifying which one of a plurality of areas in the vehicle cabin the driver is currently looking at, wherein the plurality of areas comprises at least a first area and a second area, wherein a distance between the second area and an area corresponding to a non-distracted state is greater than a distance between the first area and the area corresponding to a non-distracted state;

wherein a first threshold associated with distraction and corresponding to at least one of a first time or a first frequency is defined for the first area;

wherein a second threshold associated with distraction and corresponding to at least one of a second time less than the first time or a second frequency less than the first frequency is defined for the second area; and causing at least one of: displaying a visual notification in a display region proximal to or coincident with the identified area, or inhibiting functionality associated with the display region, in dependence on identification of the driver distracted state determined by exceedance of the one of the first threshold and the second threshold corresponding to the identified area.

20. The method as claimed in claim 19, wherein the first area corresponds to an instrument display panel and the second area corresponds to an infotainment system display panel.

* * * * *

UNITED STATES PATENT AND TRADEMARK OFFICE
CERTIFICATE OF CORRECTION

PATENT NO. : 10,040,350 B2
APPLICATION NO. : 15/306595
DATED : August 7, 2018
INVENTOR(S) : Dias et al.

It is certified that error appears in the above-identified patent and that said Letters Patent is hereby corrected as shown below:

In the Claims

Column 17, Claim 16, Line 41 through Column 18, Line 1:
Please correct "driverd- istracted" to read -- driver distracted --

Signed and Sealed this
Twentieth Day of November, 2018

Andrei Iancu
*Director of the United States Patent and Trademark Office*